United States Patent
Matsumoto et al.

(10) Patent No.: US 12,482,132 B2
(45) Date of Patent: Nov. 25, 2025

(54) INFORMATION PROCESSING APPARATUS, INFORMATION PROCESSING METHOD, AND PROGRAM

(71) Applicant: NEC Corporation, Tokyo (JP)

(72) Inventors: Yuya Matsumoto, Tokyo (JP); Jiro Abe, Tokyo (JP); Tatsuya Sumiya, Tokyo (JP); Kazumine Ogura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 176 days.

(21) Appl. No.: 18/376,093

(22) Filed: Oct. 3, 2023

(65) Prior Publication Data

US 2024/0127475 A1 Apr. 18, 2024

(30) Foreign Application Priority Data

Oct. 14, 2022 (JP) ................................. 2022-165152

(51) Int. Cl.
*G06T 7/73* (2017.01)
*G06T 15/20* (2011.01)

(52) U.S. Cl.
CPC ................. *G06T 7/74* (2017.01); *G06T 15/20* (2013.01); *G06T 2207/10028* (2013.01); *G06T 2207/30244* (2013.01); *G06T 2210/56* (2013.01)

(58) Field of Classification Search
None
See application file for complete search history.

(56) References Cited

U.S. PATENT DOCUMENTS

2018/0033158 A1* 2/2018 Campbell ............. G06F 3/0488
2019/0222776 A1* 7/2019 Carter ................... H04N 5/272

FOREIGN PATENT DOCUMENTS

JP 2018-200504 A 12/2018

* cited by examiner

*Primary Examiner* — Frank S Chen
(74) *Attorney, Agent, or Firm* — Sughrue Mion, PLLC

(57) ABSTRACT

An information processing apparatus according to the present disclosure includes: at least one memory configured to store instructions; and at least one processor configured to execute the instructions to: generate, for each of a plurality of virtual cameras in a three-dimensional space, a virtual camera image shot by the respective one of the virtual cameras on the basis of point cloud data of the three-dimensional space; and estimate, on the basis of similarity between the virtual camera image generated by having the processor execute the generation instruction and a camera image shot by a camera, location and orientation of the camera when it shot the camera image.

10 Claims, 14 Drawing Sheets

| LOCATION ID | POINT CLOUD DATA | LOCATION INFORMATION |
|---|---|---|
| LOCATION A | POINT CLOUD DATA A | LOCATION INFORMATION A |
| LOCATION B | POINT CLOUD DATA B | LOCATION INFORMATION B |
| ... | ... | ... |

Fig. 4

| LOCATION ID | VIRTUAL CAMERA ID | VIRTUAL CAMERA IMAGE | LOCATION INFORMATION | ORIENTATION INFORMATION |
|---|---|---|---|---|
| LOCATION A | VIRTUAL CAMERA A1 | VIRTUAL CAMERA IMAGE A1 | LOCATION INFORMATION A1 | ORIENTATION INFORMATION A1 |
| | VIRTUAL CAMERA A2 | VIRTUAL CAMERA IMAGE A2 | LOCATION INFORMATION A2 | ORIENTATION INFORMATION A2 |
| | ... | ... | ... | ... |
| LOCATION B | ... | ... | ... | ... |
| ... | ... | ... | ... | ... |

Fig. 10

INFORMATION PROCESSING APPARATUS, INFORMATION PROCESSING METHOD, AND PROGRAM

INCORPORATION BY REFERENCE

This application is based upon and claims the benefit of priority from Japanese patent application No. 2022-165152, filed on Oct. 14, 2022, the disclosure of which is incorporated herein in its entirety by reference.

TECHNICAL FIELD

The present disclosure relates to an information processing apparatus, an information processing method and a program.

BACKGROUND ART

Japanese Unexamined Patent Application Publication No. 2018-200504 discloses a technique for obtaining a set of three-dimensional coordinates of three-dimensional points of at least one object included in three-dimensional point cloud data, obtaining, from an input image, a set of coordinates representing the end points of edges included in the input image, and modifying information on the location and orientation of a camera using the set of three-dimensional coordinates and the set of coordinates representing the end points of edges, thereby estimating the location and orientation of the camera when it shot the input image.

However, the technique described in Japanese Unexamined Patent Application Publication No. 2018-200504 has such a problem that the process of estimating the location and orientation of a camera when it shot an image is relatively time-consuming.

SUMMARY

In view of the above-mentioned problem, an object of the present disclosure is to provide a technique capable of more appropriately estimating the location and orientation of a camera when it shot an image.

According to a first example aspect of the present disclosure, an information processing apparatus includes:
at least one memory configured to store instructions; and
at least one processor configured to execute the instructions to:
generate, for each of a plurality of virtual cameras in a three-dimensional space, a virtual camera image shot by the respective one of the virtual cameras on the basis of point cloud data of the three-dimensional space; and
estimate, on the basis of similarity between the virtual camera image generated by having the processor execute the generation instruction and a camera image shot by a camera, location and orientation of the camera when it shot the camera image.

According to a second example aspect of the present disclosure, an information processing method includes:
generating, for each of a plurality of virtual cameras in a three-dimensional space, a virtual camera image shot by the respective one of the virtual cameras on the basis of point cloud data of the three-dimensional space; and
estimating, on the basis of similarity between the generated virtual camera image and a camera image shot by a camera, location and orientation of the camera when it shot the camera image.

According to a third example aspect of the present disclosure, a non-transitory computer readable medium stores a program for causing a computer to execute processes of:
generating, for each of a plurality of virtual cameras in a three-dimensional space, a virtual camera image shot by the respective one of the virtual cameras on the basis of point cloud data of the three-dimensional space; and
estimating, on the basis of similarity between the generated virtual camera image and a camera image shot by a camera, location and orientation of the camera when it shot the camera image.

BRIEF DESCRIPTION OF DRAWINGS

The above and other aspects, features and advantages of the present disclosure will become more apparent from the following description of certain example embodiments when taken in conjunction with the accompanying drawings, in which:

FIG. 4 is a diagram showing an example of information stored in a point cloud data DB (database) according to an example embodiment;

FIG. 10 shows an example of information stored in a virtual camera image DB according to an example embodiment;

EXAMPLE EMBODIMENT

The principles of the present disclosure will be described with reference to some exemplary example embodiments. It should be understood that these example embodiments are described for illustrative purposes only and will assist those skilled in the art in understanding and implementing the present disclosure without suggesting any limitations with respect to the scope of the present disclosure. The disclosure described herein may be implemented in a variety of ways other than those described below.

In the following description and claims, unless otherwise defined, all technical and scientific terms used herein have the same meanings as are generally understood by those skilled in the art to which the present disclosure belongs.

Hereinafter, example embodiments of the present disclosure will be described with reference to the drawings.

Each of the drawings or figures is merely an example to illustrate one or more example embodiments. Each figure may not be associated with only one particular example embodiment, but may be associated with one or more other example embodiments. As those of ordinary skill in the art will understand, various features or steps described with reference to any one of the figures can be combined with features or steps illustrated in one or more other figures, for example, to produce example embodiments that are not explicitly illustrated or described. Not all of the features or steps illustrated in any one of the figures to describe an example embodiment are necessarily essential, and some features or steps may be omitted. The order of the steps described in any of the figures may be changed as appropriate.

First Example Embodiment

Configuration

Figure 1:
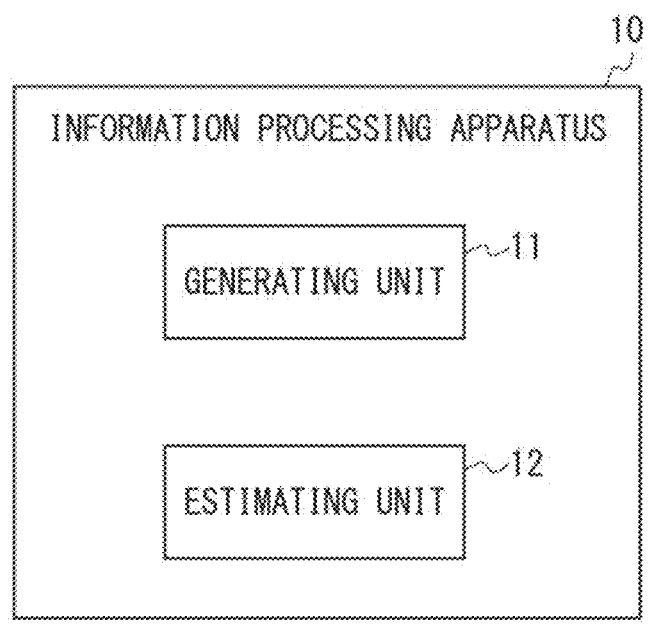
FIG. 1 is a diagram showing an example of a configuration of an information processing apparatus according to an example embodiment.

Referring to FIG. 1, a configuration of an information processing apparatus 10 according to an example embodiment will be described. FIG. 1 is a diagram showing an example of the configuration of the information processing apparatus 10 according to an example embodiment. The information processing apparatus 10 includes a generating unit 11 and an estimating unit 12. These components may be implemented by collaborative operation of one or more programs installed in the information processing apparatus 10 and hardware such as a processor and a memory of the information processing apparatus 10.

The generating unit 11 generates, for each virtual camera, a virtual camera image shot by a virtual camera in a three-dimensional space on the basis of the point cloud data of the three-dimensional space. The estimating unit 12 estimates, on the basis of similarity between the virtual camera image generated by the generating unit 11 and a camera image shot by a camera, the location and the orientation of the camera when it shot the camera image.

Second Example Embodiment

Next, with reference to FIG. 2, the configuration of the information processing apparatus 10 according to an example embodiment will be described.

Hardware Configuration

Figure 2:
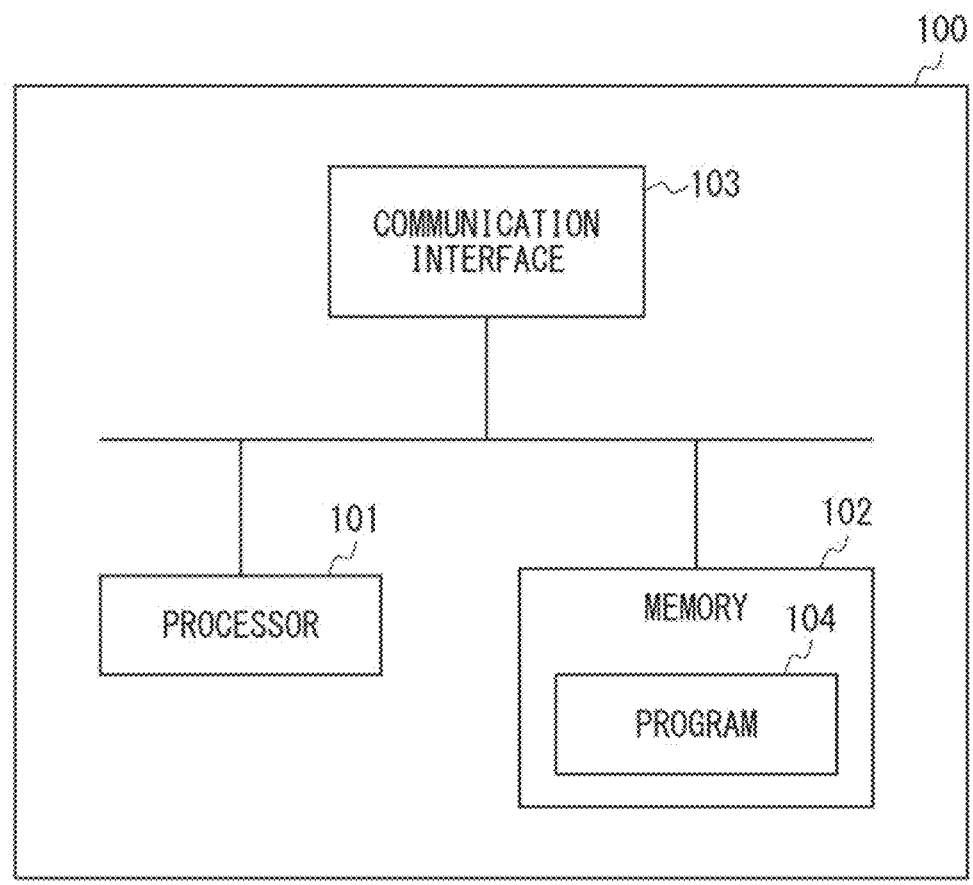
FIG. 2 is a diagram showing an example of a hardware configuration of an information processing apparatus according to an example embodiment.

FIG. 2 is a diagram showing an example of a hardware configuration of the information processing apparatus 10 according to an example embodiment. In the example illustrated in FIG. 2, the information processing apparatus 10 (a computer 100) includes a processor 101, a memory 102, and a communication interface 103. These components may be mutually connected via a bus or the like. The memory 102 stores at least a part of a program 104. The communication interface 103 includes an interface required for communication with other network elements.

When the program 104 is executed collaboratively with the processor 101, the memory 102, and the like, the computer 100 performs at least a part of the processing according to an example embodiment of the present disclosure. The memory 102 may be of any type. The memory 102 may be a non-temporary computer readable storage medium as a non-limiting example. The memory 102 may also be implemented using any suitable data storage techniques such as semiconductor-based memory devices, magnetic memory devices and systems, optical memory devices and systems, and fixed and removable memories. While the computer 100 shown in FIG. 2 includes only one memory 102, the computer 100 may have several physically distinct memory modules. The processor 101 may be of any type. The processor 101 may include at least one of a general-purpose computer, a dedicated computer, a microprocessor, a digital signal processor (DSP), and as a non-limiting example, a processor configured on the basis of a multi-core processor architecture. The computer 100 may include a plurality of processors such as an application-specific integrated circuit chip that is temporally dependent on a clock that synchronizes the main processor.

The example embodiments of the present disclosure may be implemented in hardware or dedicated circuits, software, logic, or any combination thereof. Some aspects of the present disclosure may be implemented in hardware, while others may be implemented in firmware or software that may be executed by a controller, a microprocessor, or other computing devices.

The present disclosure also provides at least one computer program product that is tangibly stored in a non-temporary computer readable storage medium. The computer program product includes computer executable instructions, such as instructions contained in program modules, and is executed on a device on a real or a virtual target processor to thereby execute the process or the method of the present disclosure. Program modules include routines, programs, libraries, objects, classes, components, data structures, and the like that perform a specific task or implement a specific abstract data type. The functions of program modules may be combined or divided among the program modules as desired in various example embodiments. The machine executable instructions in program modules can be executed locally or within distributed devices. In a distributed device, program modules can be arranged on both local and remote storage media.

The program codes for implementing the method of the present disclosure may be written in any combination of one or more programming languages. These program codes may be provided to a processor or controller of a general-purpose computer, a dedicated computer, or other programmable data processing apparatus. When the program codes are executed by a processor or a controller, the implemented functions/operations in the flowcharts and/or the block diagrams are executed. The program codes are executed entirely on the machine, partly on the machine as a stand-alone software package, partly on the machine, partly on a remote machine, or entirely on a remote machine or a server.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Processing

<<Processing for Generating Virtual Camera Image>>

Figure 3:
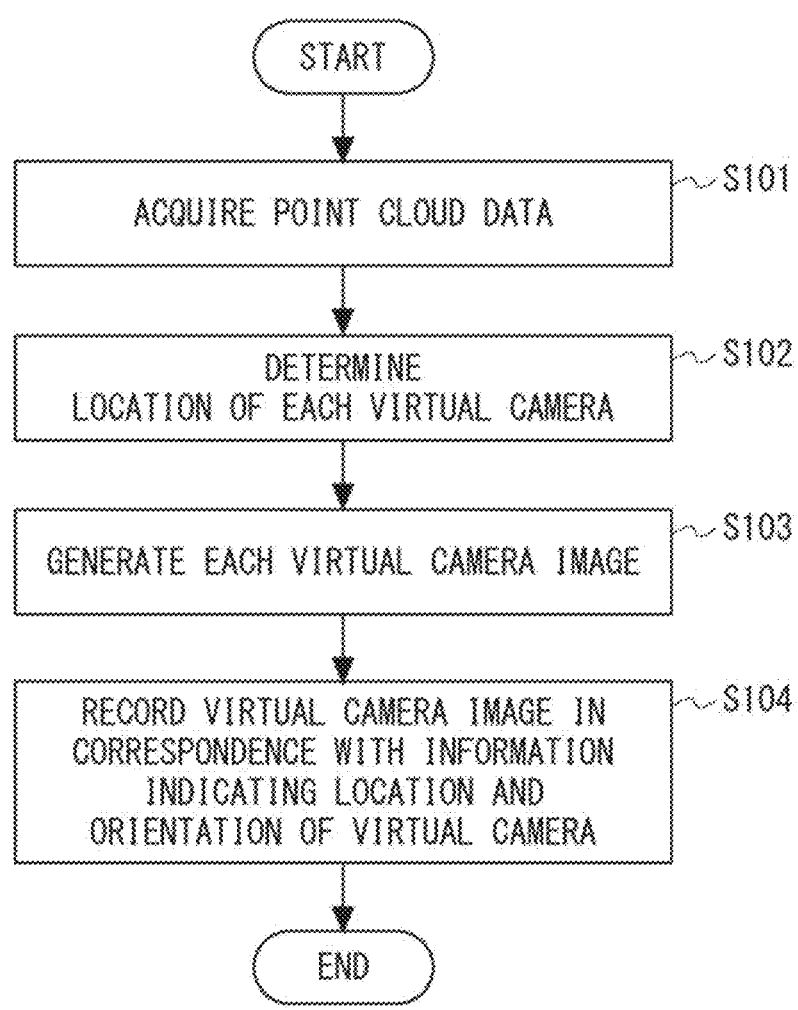
FIG. 3 is a flowchart showing an example of a process for generating a virtual camera image with an information processing apparatus according to an example embodiment.

Next, an example of processing for generating a virtual camera image of the information processing apparatus 10 according to an example embodiment will be described with reference to FIGS. 3 to 10. FIG. 3 is a flowchart showing an example of the processing for generating a virtual camera image of the information processing apparatus 10 according to an example embodiment. The processing shown in FIG. 3 may be executed when, for example, a predetermined operation is performed by an operator (an administrator) of the information processing apparatus 10. The order of the steps of the processing shown in FIG. 3 may be changed as appropriate as long as it does not cause any inconsistency. For example, the processing from Step S102 to Step S104 may be executed sequentially for each virtual camera.

In Step S101, the generating unit 11 acquires point cloud data of the three-dimensional space from a point cloud data DB 401. The point cloud data DB 401 may be stored in an internal memory of the information processing apparatus 10 or an external memory (e.g., a DB server). The information in the point cloud data DB 401 may be recorded in advance by an operator or the like of the information processing apparatus 10.

FIG. 4 is a diagram showing an example of information stored in a point cloud data DB (database) 401 according to an example embodiment. In the example illustrated in FIG. 4, the point cloud data DB 401 stores point cloud data and the location information in correspondence with the location ID. The location ID is information identifying the location (facility) where measurement (acquisition, measurement, generation) of the point cloud data was performed.

Point cloud data may be generated, for example, by at least one of a LiDAR (Light Detection And Ranging, Laser Imaging Detection And Ranging), a ToF (Time of Flight) camera, a stereo camera, and a 3D (Dimension) scanner. The point cloud data (point cloud) may be, for example, a set of point (observation point) data on the surface of an object in a three-dimensional space. Each point data may include a value indicating a location in, for example, a Cartesian coordinate system (x, y, z) or the like. Each point data may also include, for example, color and location information in a real space (latitude, longitude, altitude). The color of each point may be measured, for example, by a LiDAR equipped with a camera. The location information of each point in a real space may be calculated, for example, on the basis of the location information set by an operator or the like for each of a plurality of points included in the point cloud data.

Subsequently, the generating unit 11 determines the location of each of the plurality of virtual cameras in the three-dimensional space (Step S102). Here, the generating unit 11 may first perform downsampling of the point cloud data using a method such as FPS (Farthest Point Sampling) method.

Further, the generating unit 11 may recognize an area that is accessible to humans (hereinafter referred to as a human-accessible area) on the basis of the point cloud data and determine the location of the virtual camera on the basis of the recognized information. In this case, the generating unit 11 may detect an area such as the ground on the basis of the point cloud data using AI (artificial intelligence) or the like, and determine areas that are not blocked by objects or the like in the detected area such as the ground as the human-accessible areas. By the above configuration, it is possible to detect, for example, a location that is relatively likely to be selected as a shooting location where a maintenance staff performs shooting. Alternatively, the generating unit 11 may detect an area such as the ground by determining whether the normal line direction of the points is similar to the vertical direction (for example, the difference in both directions is within a certain threshold). Alternatively, the generating unit 11 may detect an area such as the ground by using a technique of extracting a plane area from point cloud data, such as plane fitting. Then, the generating unit 11 may determine a location in the human-accessible area as a horizontal location (latitude, longitude) of the virtual camera. For example, the generating unit 11 may determine a location at a specific height (e.g., 1.6 meters) from the altitude of the human-accessible area as a vertical location (altitude) of the virtual camera.

Figure 5:
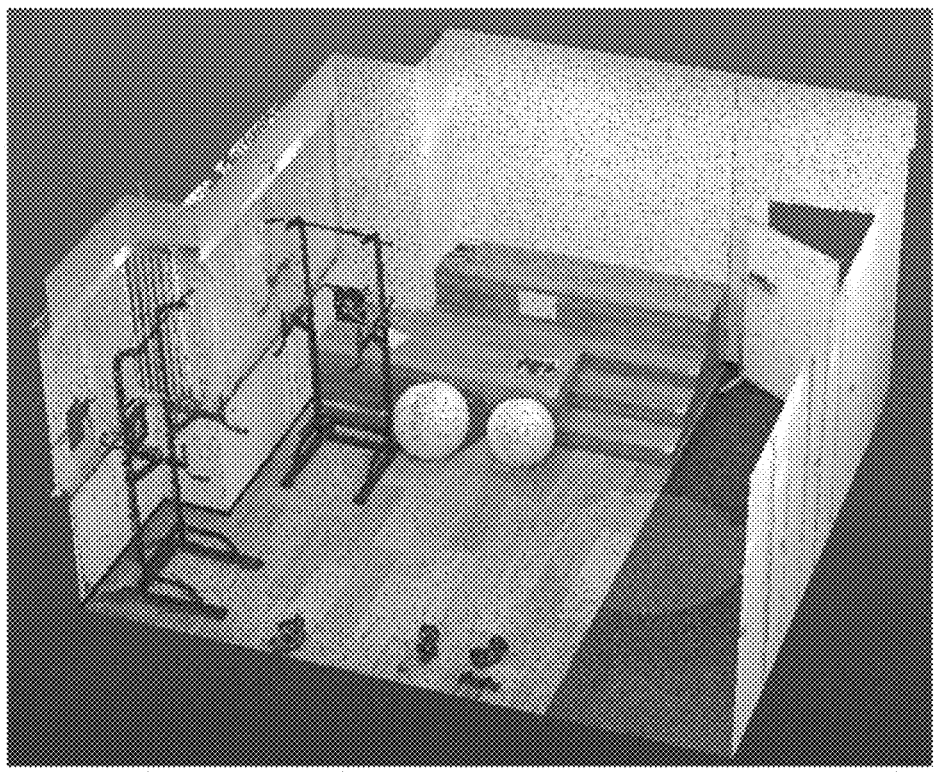
FIG. 5 is a diagram showing an example of point cloud data according to an example embodiment.
Figure 6:
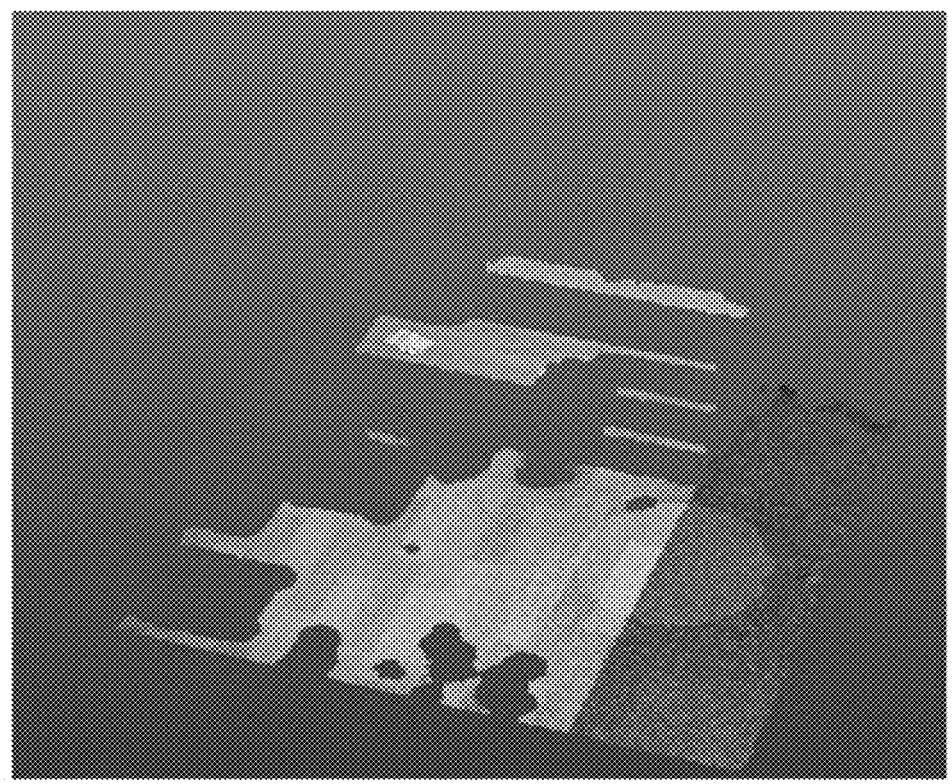
FIG. 6 is a diagram showing an example of a human-accessible area according to an example embodiment.

FIG. 5 is a diagram showing an example of point cloud data 501 according to an example embodiment. In the example illustrated in FIG. 5, a display example of the point cloud data 501 generated when a specific room is measured by LiDAR is shown. FIG. 6 is a diagram showing an example of a human-accessible area 601 according to an example embodiment. In the example illustrated in FIG. 6, the human-accessible area 601 detected from the point cloud data 501 of FIG. 5 is shown. In the example illustrated in FIG. 6, a floor surface 611 and a horizontal part 612 of a staircase in a specific room are detected as human-accessible areas.

The generating unit 11 may also determine the location and orientation of the virtual camera on the basis of the normal direction of the face of the object specified on the basis of a plurality of points included in the point cloud data. In this case, on the basis of a specific point and the point cloud around the specific point the generating unit 11 may, for example, specify a face of an object including the specific point. Then, the generating unit 11 may, for example, determine the horizontal location of the virtual camera in the human-accessible area, which is distant from the specific point in the normal direction. The normal line direction of the surface may be a direction of the sensor side of LiDAR or the like when the point cloud data was measured, as viewed from the surface. The generating unit 11 may, for example, determine the orientation of the virtual camera so that the virtual camera changes the direction it faces from the direction opposite to the normal direction (the direction from the location of the virtual camera to the specific point) to a direction within a predetermined range. In this way, the location and orientation of the camera, which is considered relatively likely to be selected by the maintenance personnel when the maintenance personnel shoots the object including the specific point with the camera, can be determined as the location and orientation of the virtual camera.

In addition, the generating unit 11 may recognize at least one of area where a specific object is present and the human-accessible area on the basis of the point cloud data and determine, on the basis of the aforementioned recognized information, at least one of the location and orientation of the virtual camera. In this case, the generating unit 11 may specify the type of the object indicated by each point in the point cloud data on the basis of, for example, AI using deep learning or the like. The generating unit 11 may determine, for example, an object of a specific type such as a bridge, an outer wall, a power generation facility, or the like as the specific object. Thus, it is possible to detect, for example, an object which is considered relatively likely to be selected as a subject to be shot by a maintenance staff. The generating unit 11 may then determine, as the location and orientation of the virtual camera, the location and orientation of the virtual camera which is capable of shooting at least a part of the specific object from a human-accessible area.

(Example of Determining Location and Orientation of Virtual Camera on the Basis of Camera Image Shot in the Past)

The generating unit 11 may determine the location and orientation of the virtual camera on the basis of the camera image shot in the past. Thus, for example, the location and orientation of the camera, which is considered relatively likely to be used by a maintenance personnel when shooting an image in the future, can be set as the location and orientation of the virtual camera. In this case, the generating unit 11 may determine the location and orientation of the virtual camera on the basis of the location and orientation of the camera when it shot the first camera image (the camera image shot in the past) estimated by the estimating unit 12.

Subsequently, the generating unit 11 generates images (virtual camera images, projected images) of the three-dimensional space shot by each virtual camera (Step S103). Here, the generating unit 11 generates (performs rendering of) a virtual camera image on the basis of the point cloud data, the location and orientation of the virtual camera, and the shooting settings of each virtual camera. The settings related to shooting by the virtual camera may include, for example, information such as the angle of view and focal length (zoom) of the virtual camera.

In this case, for example, when each point included in the point cloud data is a sphere or the like having a specific size, the generating unit 11 may generate data as a virtual camera image that projects each point nearest to it in each direction as viewed from the virtual camera.

Figure 7:
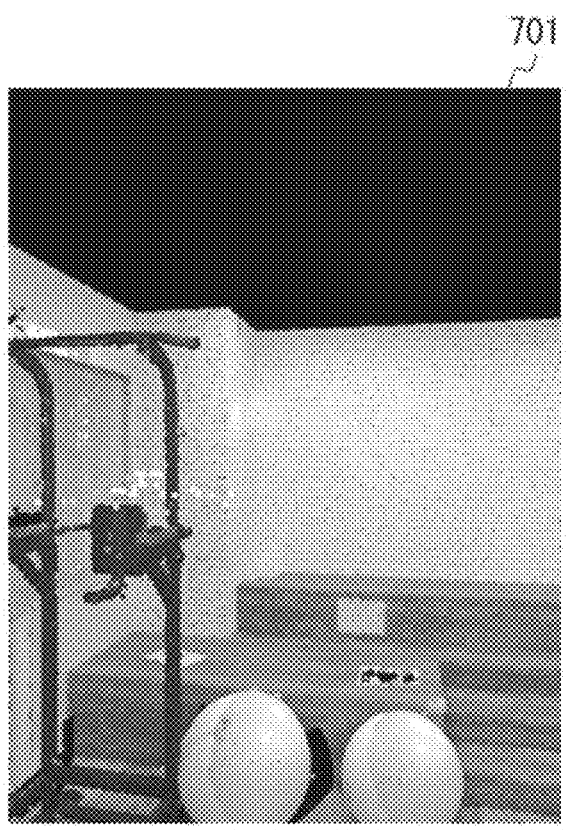
FIG. 7 is a diagram showing an example of a virtual camera image according to an example embodiment.
Figure 8:
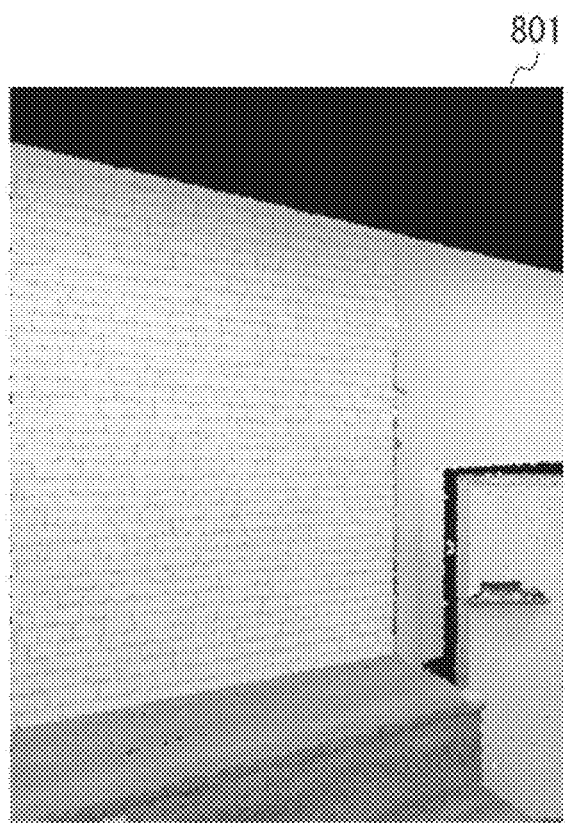
FIG. 8 is a diagram showing an example of a virtual camera image according to an example embodiment.
Figure 9:
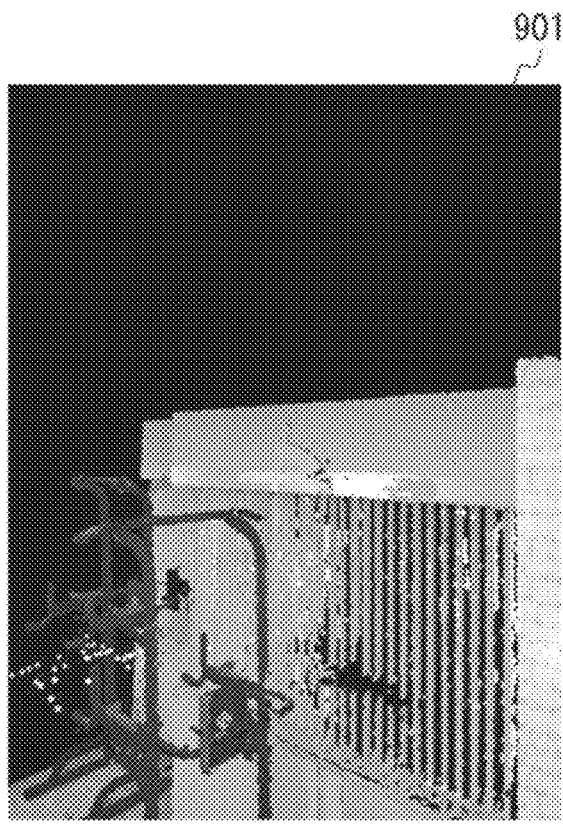
FIG. 9 shows an example of a virtual camera image according to an example embodiment.

FIGS. 7 to 9 are diagrams showing an example of a virtual camera image according to an example embodiment. FIGS. 7 to 9 show an example of virtual camera images 701, 801, and 901, respectively, generated on the basis of the point cloud data 501 shown in FIG. 5.

Subsequently, for each virtual camera image, the generating unit 11 records the virtual camera image in correspondence (association) with the information indicating the location and orientation of the virtual camera in the three-dimensional space in a virtual camera image DB 501 (Step S104). The virtual camera image DB 501 may be stored in an internal memory of the information processing apparatus 10 or stored in an external memory (e.g., a DB server).

FIG. 10 is a diagram showing an example of information stored in a virtual camera image DB 1001 according to an example embodiment. In the example illustrated in FIG. 10, a virtual camera image, location information, and orientation information are recorded in the virtual camera image DB 1001 in correspondence with a combination of a location ID and a virtual camera ID. The location information is information indicating the location of the virtual camera in a three-dimensional space. The orientation information is information indicating the orientation of the virtual camera in a three-dimensional space. The orientation information may include, for example, information on a roll angle, a pitch angle, and a yaw angle of the camera in the three-dimensional space. Alternatively, the orientation information may include information equivalent to a three-dimensional rotation matrix.

<<Process for Estimating Camera Image Shooting Location and Camera Orientation>>

Figure 11:
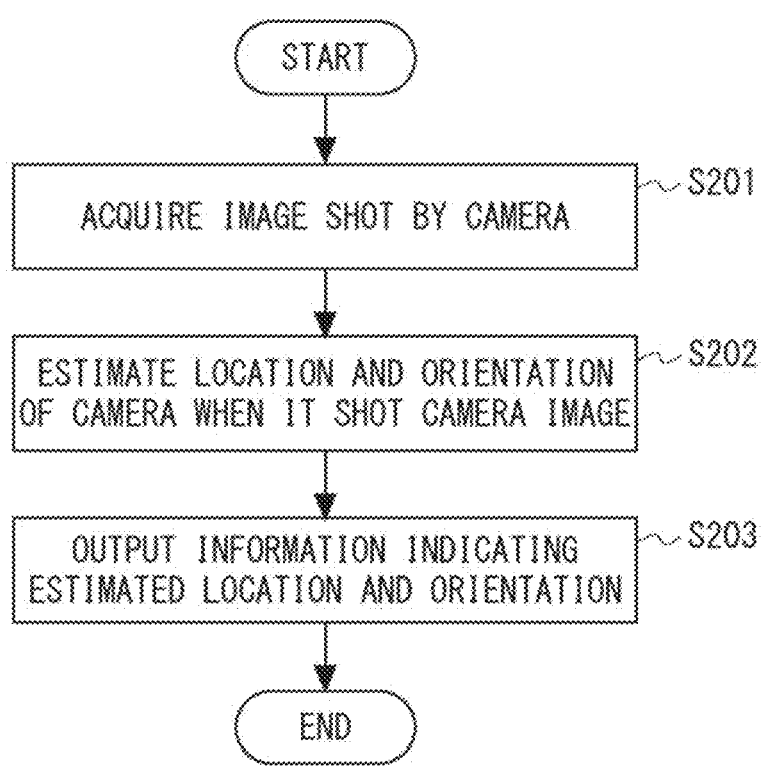
FIG. 11 is a flowchart showing an example of a process of estimating a camera image shooting location and camera orientation of an information processing apparatus according to an example embodiment when it shot a camera image.

Next, an example of processing for estimating the camera image shooting location and camera orientation of the information processing apparatus 10 according to an example embodiment when it shot a camera image will be described with reference to FIGS. 11 to 14. FIG. 11 is a flowchart showing an example of processing for estimating the camera image shooting location and camera orientation of the information processing apparatus 10 according to an example embodiment when it shot a camera image. The processing shown in FIG. 11 may be executed when, for example, a predetermined operation is performed by an operator (administrator) of the information processing apparatus 10. It should be noted that the order steps of the processing shown in FIG. 11 may be changed as appropriate as long as it does not cause any inconsistency.

In Step S201, the estimating unit 12 acquires (i.e., inputs) images (e.g., camera images, query images) shot by the camera. Here, the estimating unit 12 may acquire, for example, a camera image and a location ID designated by an operator or the like.

Subsequently, the estimating unit 12 estimates the rough location and orientation (the initial location and orientation; an example of "a first location and orientation") of the camera when it shot the camera image (Step S202). Here, the estimating unit 12 may calculate the degree of similarity between each virtual camera image and the camera image on the basis of the image features (the local features or the global features) of each virtual camera image recorded in the virtual camera image DB 1001 in correspondence with the location ID and the image features of the camera image. In this case, the estimating unit 12 may calculate the degree of similarity by, for example, comparing VLAD (Vector of Locally Aggregated Descriptors) that can represent the global feature amounts by aggregating the differences between each local feature amount and the corresponding basis vector. The estimating unit 12 may, for example, perform local feature matching between each virtual camera image and the camera image, and calculate the degree of similarity between each virtual camera image and the camera image on the basis of the number of matches, the sum of scores of the matching, and the like. The scores may be, for example, the degree of similarity of the matching or the degree of certainty of the matching (the degree of matching calculated in the local feature matching process).

The estimating unit 12 may specify at least one of the plurality of virtual camera images generated by generating unit 11 in an descending order starting from a virtual camera image with the highest similarity with the camera image, and estimate it as the location and orientation of the camera. Then, the estimating unit 12 may estimate the location and orientation of the virtual camera which shot the virtual camera image having the highest degree of similarity with the camera image among the plurality of virtual camera images generated by the generating unit 11 as being the rough location and orientation of the virtual camera. Further, the estimating unit 12 may estimate the location and orientation of the virtual camera which shot the respective virtual camera images in the descending order from the highest similarity as the candidate location and orientation of the camera.

Figure 12:
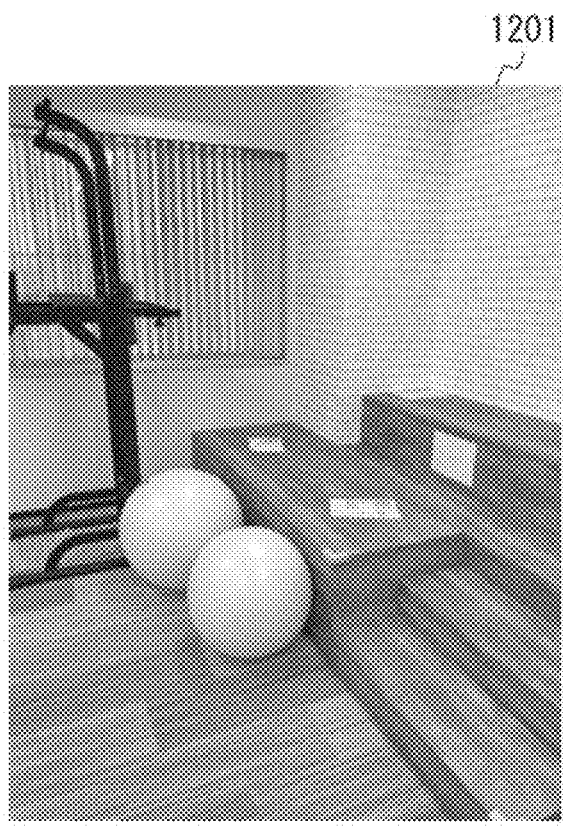
FIG. 12 is a diagram showing an example of a camera image according to an example embodiment.

FIG. 12 is a diagram showing an example of a camera image 1201 according to an example embodiment. When the camera image shown in FIG. 12 is input, the location and orientation of the virtual camera which shot the virtual camera image 701 having the highest similarity with the camera image among the virtual camera images 701, 801, and 901 shown in FIGS. 7 to 9 are estimated as being the rough location and orientation of the camera.

Further, the estimating unit 12 may estimate the location and orientation calculated based on the weight factor corresponding to the similarity between each of the plurality of virtual camera images generated by the generating unit 11 and the camera image, and the location and orientation of each virtual camera as the location and orientation of the camera. In this case, the estimating unit 12 may, for example, may set the weight factor so that the higher the similarity between the virtual camera and the camera image, the larger the value of the weight factor becomes, and estimate the weighted average value of the location and orientation of each virtual camera as the location and orientation of the camera.

Figure 13:
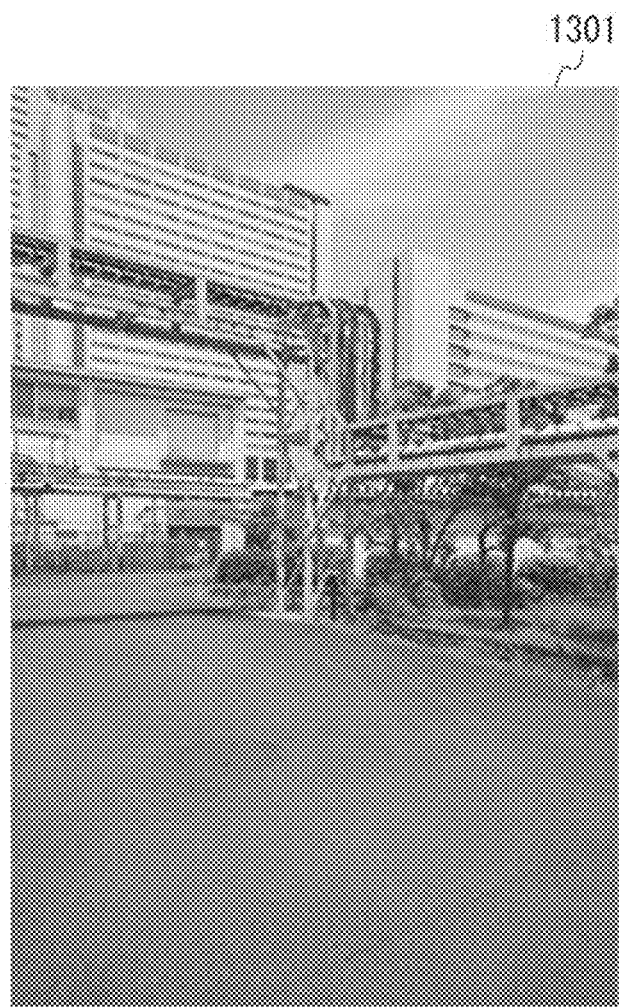
FIG. 13 is a diagram showing an example of a camera image according to an example embodiment.
Figure 14:
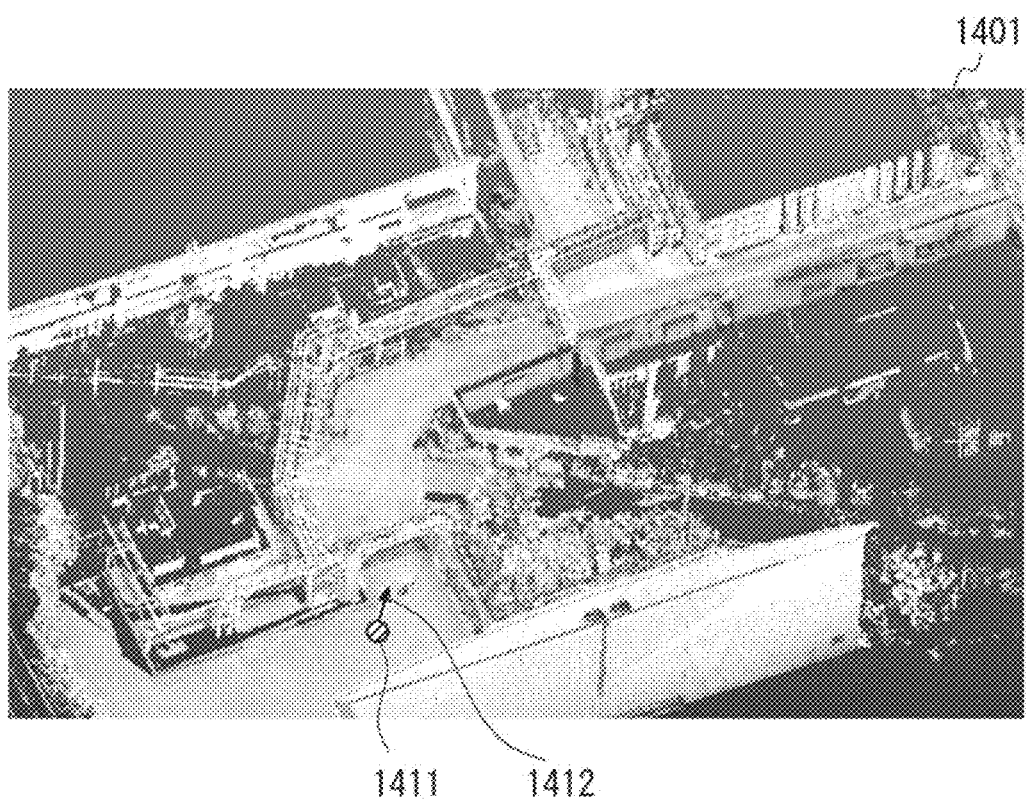
FIG. 14 is a diagram showing an example of display of point cloud data and location and orientation of a camera when it shot a camera image according to an example embodiment.

Subsequently, the estimating unit 12 outputs information indicating the location and orientation of the camera when it shot the estimated camera image (Step S203). FIG. 13 is a diagram showing an example of a camera image 1301 according to an example embodiment. FIG. 14 is a diagram showing an example of display of point cloud data and location and orientation of a camera when it shot a camera image according to an example embodiment. In the example shown in FIGS. 13 and 14, when the camera image 1301 shown in FIG. 13 is input, the estimating unit 12 displays a figure showing the location 1411 and the orientation 1412 of the camera when it shot the camera image in a manner such that it overlapped the image 1401 on which point cloud data is projected, as shown in FIG. 14.

(Example Using Location Information of the Camera Image)

In Step S202 of FIG. 11, the estimating unit 12 may determine a plurality of virtual camera images for calculating the degree of similarity of the virtual camera images with the camera image among a plurality of virtual camera images generated by the generating unit 11 based on the location information of the camera acquired by the camera when it shot the camera image. Thus, for example, the time required for performing the estimation process can be reduced.

In this case, the location information of the camera may be acquired using, for example, a satellite positioning system such as GPS (Global Positioning System), and recorded as a geo-tag of the camera image in Exif (Exchangeable image file format). In this way, for example, the shooting location can be estimated with higher accuracy for the camera image shot at a location where the accuracy of the GPS is low, such as indoors or in between tall buildings.

Further, in Step S102, the generating unit 11 may determine the location of each virtual camera based on the camera location information acquired by the camera when it shot the camera image. In this case, the generating unit 11 may, for example, calculate the location corresponding to the camera location information in the three-dimensional space indicated by the point cloud data. The generating unit 11 may, for example, arrange each virtual camera within a specific range from the calculated location. Thus, for example, the accuracy of estimation can be improved.

Modified Example

The information processing apparatus 10 may be an apparatus accommodated in one housing, but the information processing apparatus 10 of the present disclosure is not limited thereto. Each part of the information processing apparatus 10 may be implemented by, for example, a cloud computing system configured of one or more computers.

It should be noted that the present disclosure is not limited to the above example embodiments, and can be suitably changed to the extent that it does not deviate from the purpose.

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present disclosure as defined by the claims. And each example embodiment can be appropriately combined with at least one of example embodiments.

According to one aspect, the location and orientation of the camera when it shot an image can be estimated more appropriately.

The whole or part of the example embodiments disclosed above can be described as, but not limited to, the following supplementary notes.

Supplementary Note 1

An information processing apparatus comprising:
at least one memory configured to store instructions; and
at least one processor configured to execute the instructions to:
  generate, for each of a plurality of virtual cameras in a three-dimensional space, a virtual camera image shot by the respective one of the virtual cameras on the basis of point cloud data of the three-dimensional space; and
  estimate, on the basis of similarity between the virtual camera image generated by having the processor execute the generation instruction and a camera image shot by a camera, location and orientation of the camera when it shot the camera image.

Supplementary Note 2

The information processing apparatus described in Supplementary Note 1, wherein the point cloud data is generated by at least one of a LiDAR (Light Detection And Ranging, Laser Imaging Detection And Ranging), a ToF (Time of Flight) camera, a stereo camera, and a 3D (Dimension) scanner.

Supplementary Note 3

The information processing apparatus described in Supplementary Note 1 or 2, wherein the at least one processor is further configured to execute the instructions to determine location and orientation of the respective one of the virtual cameras on the basis of a normal line direction of a surface of an object specified on the basis of a plurality of points included in the point cloud data.

Supplementary Note 4

The information processing apparatus described in Supplementary Note 1 or 2, wherein the at least one processor is further configured to execute the instructions to recognize at least one of an area where a specific object is present and a human-accessible area based on the point cloud data and determine at least one of the location and the orientation of the respective one of the virtual cameras based on the recognized information.

Supplementary Note 5

The information processing apparatus described in Supplementary Note 1 or 2, wherein the at least one processor is further configured to execute the instructions to determine the location and orientation of the respective one of the virtual cameras based on the estimated location and orientation of the respective one of the virtual cameras, and generate a virtual camera image shot by the respective one of the virtual cameras in the three-dimensional space.

Supplementary Note 6

The information processing apparatus described in any one of Supplementary Notes 1 to 5, wherein the at least one processor is further configured to execute the instructions to calculate the similarity based on the respective image features of the plurality of generated virtual camera images and the image features of the camera image.

Supplementary Note 7

The information processing apparatus described in Supplementary Note 1 or 2, wherein the at least one processor is further configured to execute the instructions to specify at least one of the plurality of the generated virtual camera images in a descending order of highest similarity with the camera image, and estimate it as the location and orientation of the camera.

Supplementary Note 8

The information processing apparatus described in Supplementary Note 1 or 2, wherein the at least one processor is further configured to execute the instructions to estimate a location and orientation calculated based on the weight factor of the generated plurality of virtual camera images and the camera image according to the degree of similarity therebetween and the location and orientation of the respective one of the virtual cameras as the location and orientation of the camera.

Supplementary Note 9

The information processing apparatus described in Supplementary Note 1 or 2, wherein the at least one processor is further configured to execute the instructions to determine a plurality of virtual camera images for calculating the degree of similarity with the camera image among the plurality of the generated virtual camera images based on the location information of the camera acquired by the camera when it shot the camera image.

Supplementary Note 10

An information processing method comprising:
generating, for each of a plurality of virtual cameras in a three-dimensional space, a virtual camera image shot by the respective one of the virtual cameras on the basis of point cloud data of the three-dimensional space; and
estimating, on the basis of similarity between the generated virtual camera image and a camera image shot by a camera, location and orientation of the camera when it shot the camera image.

Supplementary Note 11

A non-transitory computer readable medium storing a program for causing a computer to execute processes of:
generating, for each of a plurality of virtual cameras in a three-dimensional space, a virtual camera image shot by the respective one of the virtual cameras on the basis of point cloud data of the three-dimensional space; and
estimating, on the basis of similarity between the generated virtual camera image and a camera image shot by a camera, location and orientation of the camera when it shot the camera image.

What is claimed is:

1. An information processing apparatus comprising:
at least one memory configured to store instructions; and
at least one processor configured to execute the instructions to:
generate, for each of a plurality of virtual cameras in a three-dimensional space, a virtual camera image shot by each one of the virtual cameras on the basis of point cloud data of the three-dimensional space; and
estimate, on the basis of similarity between the virtual camera image generated by having the processor execute the generation instruction and a camera image shot by a camera, location and orientation of the camera when it shot the camera image.

2. The information processing apparatus according to claim 1, wherein the point cloud data is generated by at least one of a LiDAR (Light Detection And Ranging, Laser Imaging Detection And Ranging), a ToF (Time of Flight) camera, a stereo camera, and a 3D (Dimension) scanner.

3. The information processing apparatus according to claim 1, wherein the at least one processor is further configured to execute the instructions to determine location and orientation of each one of the virtual cameras on the basis of a normal line direction of a surface of an object specified on the basis of a plurality of points included in the point cloud data.

4. The information processing apparatus according to claim 1, wherein the at least one processor is further configured to execute the instructions to recognize at least one of an area where a specific object is present and a human-accessible area based on the point cloud data and determine at least one of the location and the orientation of each one of the virtual cameras based on the recognized information.

5. The information processing apparatus according to claim 1, wherein the at least one processor is further configured to execute the instructions to determine the location and orientation of each one of the virtual cameras based on the estimated location and orientation of each one of the virtual cameras, and generate a virtual camera image shot by each one of the virtual cameras in the three-dimensional space.

6. The information processing apparatus according to claim 1, wherein the at least one processor is further configured to execute the instructions to calculate the similarity based on the respective image features of the plurality of generated virtual camera images and the image features of the camera image.

7. The information processing apparatus according to claim 1, wherein the at least one processor is further configured to execute the instructions to specify at least one of the plurality of the generated virtual camera images in a descending order from highest similarity thereof with the camera image, and estimate it as the location and orientation of the camera.

8. The information processing apparatus according to claim 1, wherein the at least one processor is further configured to execute the instructions to determine a plurality of virtual camera images for calculating the degree of similarity thereof with the camera image among the plurality of the generated virtual camera images based on the location information of the camera acquired by the camera when it shot the camera image.

9. An information processing method comprising:
   generating, for each of a plurality of virtual cameras in a three-dimensional space, a virtual camera image shot by each one of the virtual cameras on the basis of point cloud data of the three-dimensional space; and
   estimating, on the basis of similarity between the generated virtual camera image and a camera image shot by a camera, location and orientation of the camera when it shot the camera image.

10. A non-transitory computer readable medium storing a program for causing a computer to execute processes of:
   generating, for each of a plurality of virtual cameras in a three-dimensional space, a virtual camera image shot by each one of the virtual cameras on the basis of point cloud data of the three-dimensional space; and
   estimating, on the basis of similarity between the generated virtual camera image and a camera image shot by a camera, location and orientation of the camera when it shot the camera image.

* * * * *